Feb. 13, 1923.

C. E. JOHNSON.
PISTON RING CONSTRUCTION.
FILED MAR. 14, 1922.

1,445,020.

Inventor
Charles E. Johnson
By Frank E. Liverance Jr.
Attorney.

Patented Feb. 13, 1923.

1,445,020

UNITED STATES PATENT OFFICE.

CHARLES E. JOHNSON, OF MUSKEGON, MICHIGAN.

PISTON-RING CONSTRUCTION.

Application filed March 14, 1922. Serial No. 543,576.

*To all whom it may concern:*

Be it known that I, CHARLES E. JOHNSON, a citizen of the United States of America, residing at Muskegon, in the county of Muskegon and State of Michigan, have invented certain new and useful Improvements in Piston-Ring Constructions; and I do hereby declare the following to be a full, clear, and exact description of the invention, such as will enable others skilled in the art to which it appertains to make and use the same.

This invention relates to piston rings. Rings for retaining compression and excluding lubricant with respect to the combustion chambers of internal combustion engines are commonly used around the pistons of said engines. Of course such rings are used in other types of engines and the like, and the invention of ring which I have made is applicable thereto also. The rings are received in grooves made around the pistons, which grooves are hard to cut with absolute accuracy so that the grooves are many times more or less "snaky" in form. Furthermore it is necessary to make the widths of the grooves slightly greater than the widths of the rings received therein in order to have the rings free to spring outward against the walls of the cylinder. This gives the rings a chance to batter the sides of the grooves due to the rapid reciprocatory movements of the piston, and even if the groove walls or sides stand up and do not become battered, there is left room for the passage of some lubricant by the rings to the combustion chamber through the small spaces left between the rings and the ring grooves. In addition, the rings should be as light in weight as possible for several reasons, all decreases in weight of reciprocating parts being advantageous from a power production standpoint while groove battering is reduced.

With my invention of ring it is designed that the ring shall be very flexible so as to readily conform to the grooves of the piston, shall be relatively stiff in another direction so as to spring outwardly against the cylinder walls with the required pressure, light in weight, and of a width which is at least practically equal to the width of the groove in which placed if, in fact, it is not slightly wider, there being provision made for what amounts to a compression of the ring in the direction of its width so that the same is readily received in a ring groove and is free to move outwardly to bear against the cylinder walls, but at the same time completely fills the ring groove, bearing against the sides thereof so as to stop passage of any lubricant or other material, liquid or gaseous which the rings are designed to act as a seal against. My invention has for its object and purpose, the production of piston rings having all of these desirable qualities, and which can be produced economically so as to be commercially marketable.

For an understanding of the invention and constructions embodying the same, reference may be had to the following description, taken in connection with the accompanying drawing, in which, Fig. 1 is a perspective view of one form of piston ring made in accordance with my invention.

Like reference characters refer to like parts in the several figures of the drawing.

Figure 1:
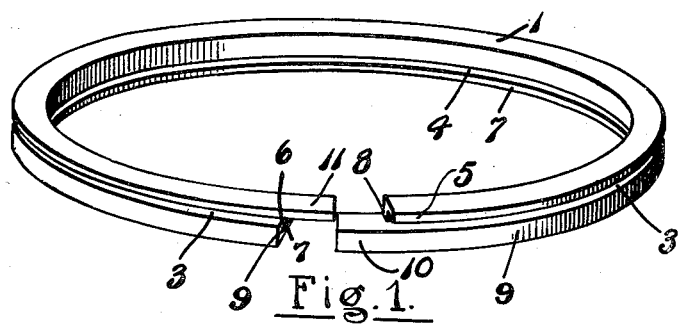
Figure 2:
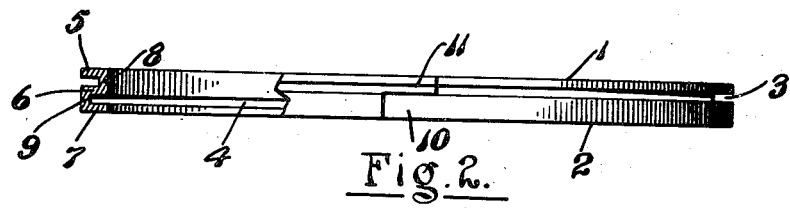
Fig. 2 is a side elevation thereof, with a part broken away and shown in section to better disclose the construction.

The ring shown in the drawings is of the concentric type, and has upper and lower sides 1 and 2 which lie in planes parallel to each other. On the outer curved side of the ring a relatively deep groove 3 is cut and a similar groove 4 is cut on the inner curved side of the ring, one groove being nearest the side 1 of the ring and the other nearest the side 2 thereof. The sides of the groove parallel the sides 1 and 2 of the ring and pass by each other to leave an interior section 6 between them, as shown, there being upper and lower parallel sections 5 and 7, the former of which is connected to the intermediate section 6 by a vertical section 8, and the latter to said intermediate section at the other end thereof by a vertical section 9, as shown. It is designed that the thickness of metal left in the various sections shall be substantially uniform and that the widths of slots 3 and 4 shall be the same as the thickness of the metal. This is the preferred construction though it does not necessarily require that the slot and metal widths must be the same.

The ring is parted at one side and a lap joint made having two overlapping ends 10 and 11. The end 10 is L-shaped in cross section, comprising the parts 5 and 8, while the end 11 is U-shaped, comprising parts 6, 9 and 7. This is for the purpose of not leaving any thin parts of metal liable to easily break, such as would be left if the tongues or ends 10 and 11 were of equal thickness, section 6 being divided midway between its upper and lower sides.

Figure 3:
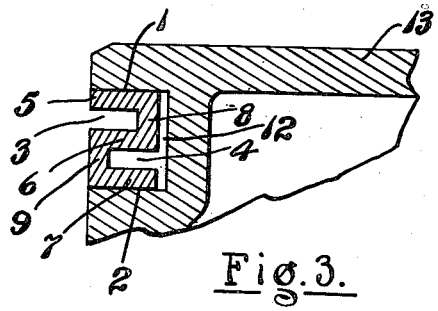
Fig. 3 is an enlarged fragmentary section of a piston and ring of my invention associated therewith.
Figure 4:
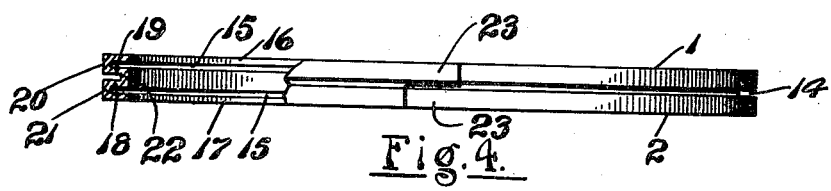
Fig. 4 is a view similar to that shown in Fig. 2 of a different form of the invention.

In Fig. 3, the ring of this form is shown located in a ring groove 12 in a piston 13. In practice, I prefer to have the ring in the first instance before the grooves 3 and 4 are cut of a width exactly the same as the width of the ring groove. When the ring is placed in the groove, it completely fills the same but does not bind against the upper and lower sides thereof as there is sufficient spring or yielding to the upper and lower sections 5 and 7, due to the cross section of the ring that the ring may move as freely as needed in the groove to permit it to press outwardly against the cylinder walls within which the piston is mounted for reciprocation. This form of ring does not lose its outward spring force and will press with the required pressure against the cylinder walls, but in the other direction is very flexible so that it conforms readily to any irregularities or snakiness of the piston grooves. The weight of the ring is reduced, as is evident. While it has been stated that the dimensions of width of the ring and groove are equal, preferably, the rings are satisfactory when made a very little wider than the width of the grooves, as the yielding of the ring or its capability of compression in the direction of its width permits the use of wider rings with an absolute insurance that the ring groove will be completely filled with the attendant advantages coming therefrom.

Figure 5:
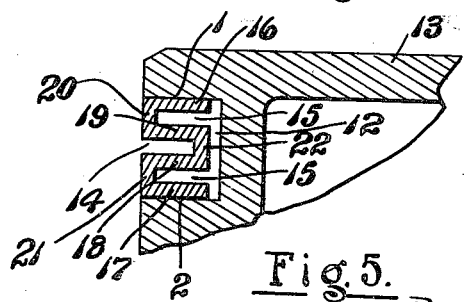
Fig. 5 is a view like that shown in Fig. 3, the second form of the piston ring being shown.

In Figs. 5 and 6 a further form is shown, sometimes used with wider rings. In such form, a groove 14 is cut deeply in the outer curved side of the ring midway between its upper and lower sides 1 and 2, and two like grooves 15 in the inner curved side of the ring, one above and the other below the middle groove 14. This leaves upper and lower sections 16 and 17, two intermediate spaced apart and parallel sections 18 and 19, and connecting vertical sections 20, 21 and 22, as shown. The lap joint or parting has two ends or tongues 23 of equal thickness with this form, the reasons for making the overlapping tongues in the first form being absent with this form.

Rings of the types shown have all of the advantages named above and are readily produced, do not have any irregularities in dimensions, the metal at all parts being of equal thickness so that a uniform tension is in every part when any part is tensioned or stressed. The manufacture is simple, a good and sufficient bearing width is provided to bear against the cylinder walls, all features named joining in making the ring one of practical value and merit. In practice they have proved exceptionally satisfactory. The invention is defined in the appended claims and is to be considered to comprehend all forms of structure coming within their scope.

I claim:

1. A piston ring of substantially uniform cross section formed at its inner and outer curved sides with continuous grooves made entirely around the ring and at different positions in the width of the ring, said grooves having sides paralleling the upper and lower sides of the ring.

2. A piston ring of substantially uniform rectangular cross section having two deep grooves cut therein, one at the outer curved side of the ring and the other at the inner curved side thereof, said grooves lying in different planes and passing by each other at their inner portions to leave a section of metal to the ring of substantial S-shape all parts of which are of substantially equal thickness.

3. A piston ring having parallel flat sides and substantially concentric inner and outer curved sides, said ring having deep grooves cut therein from its curved sides paralleling the flat sides of the ring and each other, substantially as described.

In testimony whereof I affix my signature.

CHARLES E. JOHNSON.